R. E. HELLMUND.
CONTROL SYSTEM.
APPLICATION FILED NOV. 7, 1917.
1,302,041.
Patented Apr. 29, 1919.
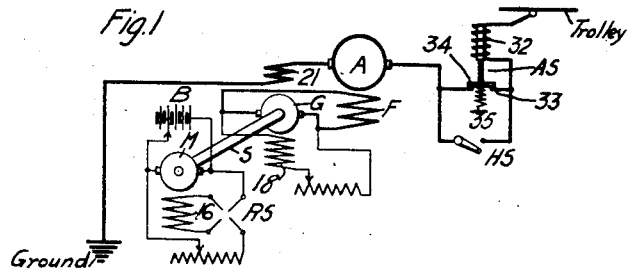
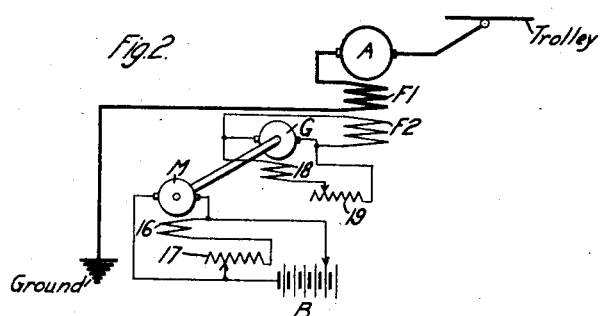
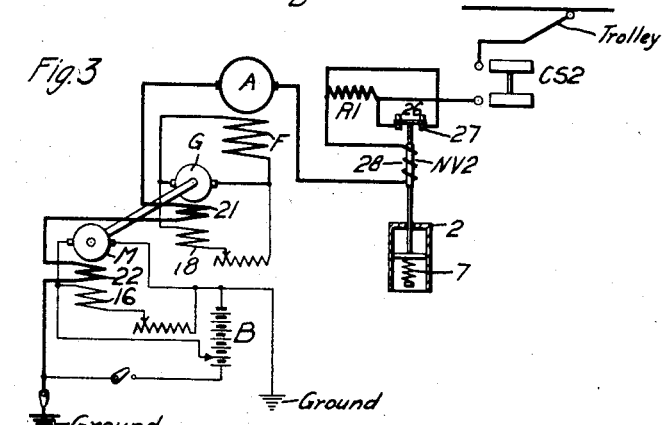
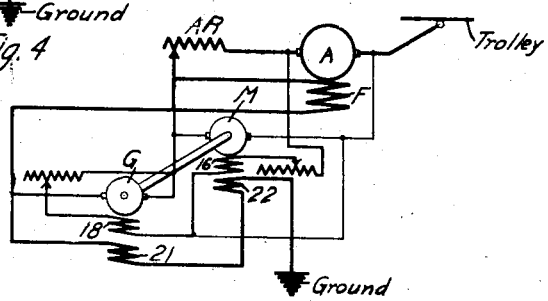
WITNESSES:
J.T. Wurmb.
W.R. Coley
INVENTOR
Rudolf E. Hellmund.
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,302,041.    Specification of Letters Patent.    Patented Apr. 29, 1919.

Original application filed September 25, 1914, Serial No 863,504. Divided and this application filed November 7, 1917. Serial No. 200,654.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Control Systems, of which the following is a specification, this application being a division of my copending application, Serial No. 863,504, filed September 25, 1914.

My invention relates to systems of control, and it has special reference to means for preventing the occurrence of "flash-over" conditions in dynamo-electric machines, more particularly electric railway motors, under predetermined conditions.

One object of my invention is to provide simple and reliable means of the above-indicated character which shall effectively obviate the possibility of "flash-over" of electric motors upon the resumption of supply-circuit voltage after a temporary interruption thereof, such as is caused by the trolley wheel or other current-collecting member passing under a section break or otherwise momentarily leaving the supply-circuit conductor.

More particularly, in high-voltage direct current systems and in the case of locomotives of large capacity, it may be advisable, for economical and other reasons, to provide means for preventing "flash-over" of the motor, the most common cause of which is the sudden resumption of supply-circuit energy after the temporary interruption thereof at section breaks, etc. Whenever the supply of energy is resumed, a heavy rush of current through the deënergized motor windings occurs, which causes great field-flux distortion and relatively high voltage between commutator segments. This condition arises by reason of the fact that the flux set up by the armature current, upon resumption of supply-circuit energy, readily traverses the entirely laminated armature core, and, consequently, builds up to a normal value much more rapidly than the main field flux which encounters the high magnetic reluctance of the solid iron or steel frame castings and which is, therefore, partly damped out by eddy currents.

According to my present invention, I provide various modifications of means for obviating the above-mentioned operating difficulties by energizing a part or all of the main field windings from some auxiliary source of energy when the supply-circuit energy is temporarily interrupted. The main field flux is thus maintained at a predetermined value during the interruption and, as a result, when the supply-circuit energy is resumed, the predominance of armature ampere turns over field ampere-turns is prevented, and "flash-over" conditions do not obtain.

Moreover, systems of the class mentioned have an additional advantage of flexibility of operation, in that the field current and, consequently, the armature voltage may be increased to cause the current in the motor circuit to assume a relatively low value, substantially zero if desired, before the motor circuit switches connected to the supply circuit are opened, either manually or automatically. Injurious arcing in the switches may thus be entirely avoided.

In the accompanying drawing, Figure 1 is a diagrammatic view of a control system embodying my invention, and Fig. 2, Fig. 3 and Fig. 4 are similar views of modifications of the invention.

Referring to Fig. 1 of the drawing, the system shown comprises a supply-circuit conductor marked "Trolley", a return circuit conductor marked "Ground", an electric motor having an armature A and a field magnet winding F of the series type; a motor-generator set having a motor M that is driven from a variable battery B and is provided with a variable shunt field winding 16 which may be reversed by a suitable reversing switch RS, and a generator G that is provided with a variable shunt field winding 18 and a series field winding 21 which is connected in circuit with the main armature A, the generator G being connected to energize the main field winding F; an automatic switch AS; and a parallel-connected hand-operated switch HS.

One advantage of the illustrated system in which the main motor field winding is supplied with exciting voltage from a separate source of energy, resides in its adaptability to provide means for interrupting the main motor circuit during motor operation when a substantially zero current obtains, and, consequently, without arcing. When it is desired to disconnect the main motor from the supply circuit, the auxiliary motor field winding 16 may be weakened to effect an increased speed of the motor-generator set, or the generator winding 18 may be strengthened, or both, to increase the energization of the main field winding F, thereby increasing the main armature voltage to a value that is substantially equal to the voltage impressed upon the armature A from the supply circuit. In this manner, the motor current is reduced to practically a zero value, whereupon the circuit may be broken either manually or automatically in any suitable manner. Arcing and its ensuing deleterious results may thus be obviated.

For instance, the automatic switch AS, which comprises an actuating coil 32 and coöperating stationary and movable contact members 33 and 34, respectively, that are all included in the main motor circuit, and a spring member 35 for biasing the switch to the open position, may be employed. The hand-operated switch HS is connected in parallel relation with the contact members of the switch AS. For connecting the main motor to the supply circuit, the switch HS is initially closed, thereby effecting the energization of the actuating coil 32 of the switch AS, which then closes and connects its coöperating contact members 33 and 34 in circuit with the main motor and the coil 32. For disconnecting the main motor from the supply circuit, the switch HS is opened, and the motor current is reduced to zero, as described above. The switch AS maintains its closed position until the current absorbed from the supply circuit assumes the low value referred to, when the switch automatically interrupts the motor circuit. The opening of the automatic switch AS upon a temporary interruption of supply-circuit energy will not prevent the operation of the system relative to the obviation of "flashover" conditions, inasmuch as the switch HS is closed at the time.

The system illustrated in Fig. 2 comprises a supply circuit similar to that shown in Fig. 1, a main motor that is provided with a field winding having a plurality of parts F1 and F2, a battery B, and a motor-generator set driven from the battery and connected to energize the portion F2 of the main field winding during temporary interruption of the supply-circuit energy. The motor-generator set comprises a driving motor M having a shunt field winding 16 that may be regulated by a suitable resistor 17, and a generator G having a shunt field winding 18 that may be varied by a resistor 19. In this case, "field control" of the main motor may be readily effected by variation of the field resistors 17 and 19, or of the battery B. It will be understood that, whenever a dynamotor is available, the generator G may be coupled directly thereto, and the motor M and battery B may be omitted. Where a battery is used, it may be suitably charged from the main motor circuit, if desired. In another aspect, the exciting generator G may be driven by a gas engine or other prime mover.

Fig. 3 discloses another modification, wherein a series-type field winding 22 of the auxiliary motor M is adapted to act differentially with respect to the shunt field winding 16. The generator G, as shown, has a series-type field winding 21. The field windings 21 and 22 are included in series circuit relation with the main armature A. The armature A is further connected to the supply circuit through a portion of a control switch CS2 and a resistor R1, which is paralleled by the coöperating stationary and movable contact members 26 and 27, respectively, of a suitable no-voltage graduated release switch NV2. The series-connected actuating coil 28 of the switch, when energized through the control switch CS2, is adapted to maintain contact between the contact members 26 and 27, which contact is not broken until a spring member 7 within the dash-pot 2 separates these contact members a predetermined period of time after the interruption of supply-circuit energy.

The system just described, while not suitable for maintaining the main field energization during relatively long energy interruptions, will however, produce a relatively steep main-motor speed characteristic, which is usually very desirable. This steep characteristic is obtained by reason of the fact that, whenever the armature current increases, the field-winding voltage and, therefore, the field current is increased, because of the increased excitation of the generator series field winding 21, as well as the increased speed of the motor-generator set that is caused by the field-weakening action of the differentially-connected motor field windings 22 and 16.

The function of the resistor R1 and switch NV2 is to act as a protective device in case of the above-mentioned relatively long energy interruptions. Upon the deënergization of the actuating coil 28 of the switch, the spring 7 gradually raises the movable contact member 27, until the contact members 26 and 27 separate after a predetermined period of time. If supply circuit energy is then resumed, the interposition of the resistor R1 in circuit will prevent an excessive instantaneous flow of current, if the control switch CS2 still occupies an operative position. The switch NV2 will then be closed by the energization of its actuating coil 28. If desired, the battery may be charged from the main motor circuit, by opening the switch 8a and closing the switch 8b.

Fig. 4 discloses a system comprising a suitable supply circuit including conductors respectively marked "Trolley and Ground"; the main motor having the armature A and the field magnet winding F; an accelerating resistor AR; and an auxiliary motor-generator set comprising a motor M, and a generator G that is adapted to energize the main field winding F. The purpose of this system is to effect the previously-mentioned desired results under emergency conditions, without requiring the use of a battery or other auxiliary source of energy for the small motor, the armature thereof being connected across the main armature A and the accelerating resistor AR, whereby the motor-generator set may be temporarily driven by the main machine, acting as a generator, upon an interruption of the supply-circuit voltage.

The motor M is also provided with a shunt field winding 16 which is adapted to be variably energized from the main armature A, and with a second field winding 22 that is connected in the main motor circuit. The generator G has a variable shunt field winding 18 that is connected across the terminals of the armature of the small motor M, and a second field winding 21 that is disposed in the main motor circuit.

The prevention of "flash-over" conditions in the system just described, upon the resumption of supply-circuit energy after a temporary interruption thereof, is effected as follows: The deënergization of the generator field winding 21 tends to decrease the excitation of the main field winding F, and, consequently, to decrease the voltage of the main armature A. However, the simultaneous deënergization of the auxiliary motor field winding 22 causes a corresponding increase in the speed of the motor-generator set, thereby tending to maintain a predetermined energization of the main field winding F.

I do not wish to be restricted to the specific circuit connections or arrangement of parts herein set forth, as various further modifications may be made within the spirit and scope of my invention. I desire, therefore, that only such limitations shall be imposed as are idicated in the appended claims.

I claim as my invention:

1. In a system of control, the combination with a supply circuit and a main dynamo-electric machine of the series type for driving a mechanical load and having an armature and a field winding, of an auxiliary machine connected to excit said field winding, and an auxiliary motor energized independently of said supply circuit for driving said auxiliary machine, whereby the speed and voltage thereof may be maintained after an interruption of supply-circuit energy.

2. In a system of control, the combination with a supply circuit and a main dynamo-electric machine of the series type for driving a mechanical load and having an armature and a field winding, of an auxiliary machine connected to excite said field winding, a storage battery, and an auxiliary motor energized therefrom for driving said auxiliary machine.

3. In a control system, the combination with a supply circuit and an electric motor having an armature and a field magnet winding, of auxiliary means for energizing said field winding, means for varying said energization to produce a current of relatively low value in the motor circuit, and means for thereupon automatically disconnecting the motor from said supply circuit.

4. In a control system, the combination with a supply circuit and an electric motor having an armature and a field magnet winding, of an auxiliary source of energy connected to said field winding, means for thereby varying the armature voltage of the motor to obtain a current of relatively low value in the motor circuit, and means dependent upon such current for disconnecting the motor from said supply circuit.

5. In a control system, the combination with a supply circuit, and a dynamo-electric machine having an armature and a field magnet winding, of auxiliary means for energizing said field winding, means for varying said energization to produce a current of relatively low value in the motor circuit, and means for thereupon automatically disconnecting the machine from the supply circuit.

6. In a control system, the combination with a supply circuit, and an electric motor having an armature and a field magnet winding, of an auxiliary source of energy connected to a predetermined part of said field winding, means for thereby varying the armature voltage of the motor to obtain a current of relatively low value in the motor circuit, and automatic means for thereupon disconnecting the motor from the supply circuit.

7. In a control system, the combination with a supply circuit, and a main electric motor having an armature and a field magnet winding, of an auxiliary generator connected to excite said field winding, an auxiliary motor energized independently of said supply circuit for driving said auxiliary generator, means for varying the action of the auxiliary machines to thereby vary the main armature voltage and obtain a current of relatively low value in the main-armature circuit, and automatic means for thereupon disconnecting the main motor from the supply circuit.

8. In a control system, the combination with a supply circuit and a main motor having an armature and a series-type field winding, of a source of energy independent of said supply circuit, a plurality of mechanically-connected auxiliary armatures respectively connected to excite said field winding and driven from said source, and a plurality of field windings for the auxiliary exciting armature respectively connected in circuit with the main motor and across the exciting armature.

9. In a control system, the combination with a supply circuit and a main motor having an armature and a series-type field winding, of a source of energy independent of said supply circuit, a plurality of mechanically-connected auxiliary armatures respectively connected to excite said field winding and driven from said source, and a plurality of field windings for the auxiliary exciting armature respectively connected in circuit with the main motor and excited independently of the supply circuit.

In testimony whereof, I have hereunto subscribed my name this 22nd day of Oct. 1917.

RUDOLF E. HELLMUND.

Copies of this patent may be obtained for five cents each, by addressing the "Commissioner of Patents, Washington, D. C."